United States Patent
Harter et al.

[19]

[11] Patent Number: 6,020,591
[45] Date of Patent: Feb. 1, 2000

[54] TWO-PHOTON MICROSCOPY WITH PLANE WAVE ILLUMINATION

[75] Inventors: Donald J. Harter, Ann Arbor, Mich.; Jeff A. Squier, San Diego, Calif.

[73] Assignee: IMRA America, Inc., Ann Arbor, Mich.

[21] Appl. No.: 08/892,843

[22] Filed: Jul. 11, 1997

[51] Int. Cl.$^7$ .................................................. G01N 21/64
[52] U.S. Cl. .................................... 250/458.1; 250/459.1
[58] Field of Search ............................. 250/459.1, 458.1

[56] References Cited

U.S. PATENT DOCUMENTS

| | | |
|---|---|---|
| 3,508,208 | 4/1970 | Duguay et al. . |
| 5,034,613 | 7/1991 | Denk et al. . |
| 5,381,237 | 1/1995 | Sela .......................................... 356/436 |
| 5,777,732 | 7/1998 | Hanninen et al. ....................... 356/318 |

OTHER PUBLICATIONS

W. Denk, et al, Science, vol. 248, pp. 73–76, "Two–Photon Laser Scanning Fluorescence Microscopy" Apr. 6, 1990.

G.J. Brakenhoff et al, Journal of Microscopy, vol. 181, Mar. 1996, pp. 253–259, "Real–Time Two–Photon Confocal Microscopy Using a Femtosecond, Amplified Ti:Sapphire System".

Shoji Maruo, et al, "Three–Dimensional Microfabrication with Two–Photon–Absorbed Photopolymerization" Optics Letters, vol. 22, No. 2, Jan. 15, 1997, pp. 132–134.

Winfried Denk, et al, "Two–Photon Excitation in Functional Biological Imaging", Journal of Biomedical Optics, Jul. 1996, vol. 1, No. 3, pp. 296–304.

J. Bewersdorf et al., Optics Letters, vol. 23, No. 9, "Multi-focal multiphoton microscopy" May 1, 1998, pp. 655–657.

A.Buist et al, Journal of Microscopy, vol. 192, "Real time two–photon absorption microscopy using multi point excitation", Nov. 1998, pp. 217–226.

*Primary Examiner*—Constantine Hannaher
*Attorney, Agent, or Firm*—Sughrue, Mion, Zinn, MacPeak & Seas, PLLC

[57] ABSTRACT

A two-photon fluorescence microscope employs two laser beams having pulses of respective wavelengths $\lambda_2$ and $\lambda_3$, which cause two-photon emission of a fluorophore when the pulses are spatially and temporally overlapping. The pulses of the two beams of wavelengths $\lambda_2$ and $\lambda_3$ are combined at some crossing angle $\theta$ within the specimen, causing two-photon absorption within a line-shaped region during each instant of overlap. As the pulses pass through each other, the overlapping line-shaped region moves such that a slice of the fluorophore-containing specimen is excited by two-photon absorption during the overlap period. Lateral scanning is effected without moving parts by adjusting the relative delay of the pulses in the two beams. When the crossing angle $\theta$ is set to 0, i.e., when the two beams are directed along the same axis, the pulses of the two beams form a pancake-shaped volume in which two-photon excitation occurs as the pulses spatially and temporally overlap while traveling in opposite directions. A two-dimensional detector, such as a two-dimensional charge coupled device (CCD) array, can be used to detect a two-dimensional portion of the specimen at one time without lateral scanning. A three-dimensional image can be produced by adjusting the time delay between the two pulses, thereby changing the location of the "pancake" volume created by the intersection of the two pulses.

30 Claims, 6 Drawing Sheets

TWO-PHOTON MICROSCOPY WITH PLANE WAVE ILLUMINATION

BACKGROUND OF THE INVENTION

1. Field of the Invention

The present invention relates to a method and apparatus for performing two-photon fluorescence microscopy for producing three-dimensional images of specimens.

2. Description of the Related Art

Laser fluorescence confocal microscopy is an effective technique for producing three-dimensional images. These images are created by the ability of the confocal microscope to effectively discriminate out-of-focal plane fluorescence, providing excellent depth resolution. The discrimination is achieved by placing a pinhole in front of the detector. Alternatively, two-photon absorption can be used to provide the depth discrimination.

The technique of two-photon microscopy was introduced by Denk et al. in "Two-Photon Laser Scanning Fluorescence Microscopy", *Science,* Vol. 248, pp. 73–76, (April, 1990). The motivation for using this method of microscopy over traditional laser fluorescence microscopy is multifold. The purported advantages include less damage to the biological system, the use of longer wavelengths which are more readily manipulated, and the ability to release caged compounds within a relatively confined vicinity.

These advantages arise from the fact that, while traditional laser fluorescence microscopy requires only a single photon $\lambda_1$ for excitation, two-photon microscopy (as suggested by its very name) requires the simultaneous absorption of two photons $\lambda_2 + \lambda_3$ for excitation. In terms of energy, $hc/\lambda_1 \sim hc~(1/\lambda_2 + 1/\lambda_3)$. Thus, $\lambda_2$ and $\lambda_3$ are both longer in wavelength than $\lambda_1$. However, it is important to note that $\lambda_2$ need not necessarily equal $\lambda_3$. Indeed, any combination of wavelengths can be used, as long as the net energy requirements for exciting the fluorophore are satisfied. It should also be noted that this argument can be further extended to include the simultaneous absorption of three or more wavelengths. All of these higher order, multi-photon processes result in a higher order, intensity-dependent absorption.

An example of a single-photon fluorescence microscope is illustrated in FIG. 1. Light having a wavelength $\lambda_1$ is transmitted from light source 10 through dichroic mirror 12 and imaging lens 14 into the specimen 16 along image plane 18. The incident light excites a fluorescent medium which has been introduced into the specimen 16, and causes the fluorescent medium to emit light of a different wavelength in proportion to the average power of the incident light. The back-scattered light emitted by the fluorescent medium in the specimen 16 is reflected by the dichroic mirror 121 towards a detector 20. The same technique can be applied in a transmissive geometry as well. For the single photon case, the flux emitted by the fluorophore scales linearly with pump intensity. Thus, in a normal confocal geometry, there will be appreciable fluorescence throughout the focal volume. Hence, pinholes 22 at the conjugate image plane must be used to block the out-of-focal-plane fluorescence, in order to generate an image, as illustrated in FIG. 1.

As disclosed by Denk et al. in U.S. Pat. No. 5,034,613, a two-photon imaging system may include a laser scanning microscope, a fluorophore having the appropriate emission with long wavelength (red or infrared) illumination as a stain for a sample, a sub-picosecond laser source of appropriate wavelength, a detector for the emission of the fluorophore, and signal processing provided by a computer.

For two-photon absorption, the fluorescence signal scales as the square of the pump intensity. This intensity dependence results in appreciable fluorescence being produced only at the focus (as opposed to throughout the focal volume). Therefore, an image can, in fact, be obtained without the use of the blocking pinholes required in single photon laser fluorescence microscopy.

The squared intensity dependence dictates that the laser sources most suitable for this application operate in pulsed mode rather than in continuous wave mode. It is essential to deliver to the sample light pulses having high peak power with low total energy. The laser intensity (i.e. W/cm$^2$) must be high enough for two photon absorption to proceed at an acceptable rate. The use of short pulses makes it possible to achieve the requisite intensities for sufficient signal-to-noise. However, above a certain energy level, pulses can cause photobleaching and possibly damage to the specimen. Accordingly, it is necessary to provide ultrashort pulse light with high peak power but low total energy. Thus, the duty-cycle of the laser is significantly reduced compared to the continuous wave excitation conditions. The reduced exposure to the pump radiation is considered a benefit to the specimen. Picosecond and femtosecond lasers are used for generating the two-photon fluorescence signal. Again, as the signal scales with the square of the intensity, most systems benefit from the considerably shorter femtosecond pulses, presently making these sources the tool of choice. The advent of reliable, solid-state femtosecond systems such as Ti:Al$_2$O$_3$ and fiber lasers have also helped in this respect.

Several different sources have been used to provide ultrashort pulses to a two-photon microscope. For example, the delivery of the high peak power pulses has been made in "free space" using Ti:Sapphire and Cr:LiSAF and fiber sources. Alternatively, an optical fiber delivery system capable of compensating for dispersion introduced by optical components within the microscope can be used to delivery high peak power pulses, as disclosed by Stock et al. in U.S. application Ser. No. 08/763,381.

As reported in the above-mentioned article by Denk et al. and by Brakenhoff et al. in "Real-time two-photon confocal microscopy using a femtosecond, amplified Ti:sapphire system", *Journal of Microscopy,* Vol. 181, pp. 253–259 (1996), femtosecond pulses have been used successfully in taking two-photon images utilizing both point and slit excitation conditions. A point scan requires both x and y translation of the beam to create a two-dimensional field, while the slit scan requires only an x translation to create a similar two-dimensional field. Thus, higher scan rates are possible with the slit excitation condition. Three-dimensional images for either mode of excitation (point or slit) are created by measuring any number of two-dimensional data sets as a function of specimen depth. These data sets are later reconstructed in a computer to give the full three-dimensional image.

There are many different methods by which the laser beam and specimen are scanned or deflected. Acousto-optic deflectors are generally avoided in two-photon imaging systems, owing to their intrinsically large dispersion which increases the excitation pulse width and lowers the effective achievable two-photon intensity. Mirrors mounted on galvanometric scanners are the preferred method for rastering the beam, as they have negligible dispersion, and preserve the pulse width, as illustrated in FIG. 2. Several scanners must be employed to generate the sufficient degrees of freedom to map out a two-dimensional field.

In the example shown in FIG. 2, rotating mirrors 24 and 26 are rotated to scan the incident laser beam in the x and y directions in the focal plane. In order to form a three-dimensional image, the focal plane is changed by moving the sample 28 relative to the microscope objective 30 along the optical axis. A photomultiplier tube 32 can be used to detect the emission of the fluorophore transmitted through the sample 28. If a two-dimensional charge coupled device (CCD) array is used for detection (as opposed to a photomultiplier tube), the fluorescence from the sample must also be descanned in order to create the image (i.e., the florescence must be transmitted through the scanning optics in the reverse direction of the incident beam). This can further complicate the optical design of the system. Another concern with many of the scanning systems is the nonuniform scanning velocity. This could result in differences in the lateral image quality. This problem is most likely to increase with increased scan rate.

Many important biological problems would benefit from the ability to produce three-dimensional images in real-time. Current methods of acquisition and reconstruction limit the rate at which the full three-dimensional volume can be examined. More explicitly, the rate limiting factors include: the time necessary to scan either a point or line excitation source through the specimen volume under consideration, the acquisition of each two-dimensional field at a given axial depth, the transfer of this data to some form of storage media, and finally, the manipulation of these two-dimensional fields to construct a three-dimensional profile of the specimen. A secondary consideration is also the amount of information that must be maintained in the traditional two-photon laser scanning systems. For every three-dimensional image that is produced, an enormous number of data sets is generated.

SUMMARY OF THE INVENTION

It is an object of the present invention to employ two-photon fluorescence microscopy to create a two-dimensional image of a cross-section of a specimen without deflecting the angle of incidence of the laser beam.

Another object of the present invention is to eliminate the need for moving parts to effect lateral scanning of the laser beam in a two-photon fluorescence microscope. Another object of the present invention is to accurately regulate the lateral scanning velocity of the laser beam in a two-photon fluorescence microscope.

It is a further object of the present invention to create a two-dimensional image without lateral scanning of the laser beam. A further object of the present invention is to create a three-dimensional image with a two-photon fluorescence microscope having no moving parts.

It is a further object of the present invention to produce a three-dimensional image in real-time and to reduce the amount of data storage required to produce the three-dimensional image.

To achieve the above objects, the two-photon fluorescence microscope of the present invention provides two laser beams having pulses of respective wavelengths $\lambda_2$ and $\lambda_3$, which cause two-photon emission of a fluorophore when the pulses are spatially and temporally overlapping. According to one embodiment, the pulses of the two beams are incident on a specimen along the same axis, but separated in time. A reflector which reflects light of wavelength $\lambda_2$ is disposed such that the reflected pulse of wavelength $\lambda_2$ spatially and temporally overlaps with the pulse of wavelength $\lambda_3$ within the specimen. Because the beams are co-planar, they form a pancake-shaped region in which two-photon excitation occurs. A two-dimensional detector, such as a two-dimensional charge coupled device (CCD) array can be used to detect a two-dimensional portion of the specimen at one time without lateral scanning. A three-dimensional image can be produced by changing the location of the "pancake" volume created by the intersection of the two pulses. The location of the "pancake" can be changed either by moving the specimen in the axial direction of the beams or by adjusting the relative time delay between the two pulses. The later approach enables the generation of three-dimensional images without the need for any moving parts.

According to another embodiment of the present invention, the two beams of wavelengths $\lambda_2$ and $\lambda_3$ are combined at some crossing angle θ within the specimen, causing two-photon absorption within a line-shaped region during each instant of overlap. The thickness of the line-shaped region is determined by the crossing angle θ and the duration of the pulses. As the pulses pass through each other, the overlapping line-shaped region moves such that a slice of the fluorophore-containing specimen is excited by two-photon absorption during the overlap period. Lateral scanning can be effected without moving parts by adjusting the relative delay of the pulses in the two beams.

Each pair of overlapping beams causes a volume of the specimen to emit light which can be detected as a two-dimensional field. Consequently, a three-dimensional volume can be scanned and detected quickly, enabling viewing or display of the three-dimensional image in real-time.

Further, a three-dimensional display device can be constructed using the overlapping beam principle of the present invention. Specifically, a "pancake" shaped volume of an appropriately doped display material is excited as oppositely travelling pulses of wavelengths $\lambda_2$ and $\lambda_3$ spatially and temporally overlap in a pancake shaped volume within the display material. Individual voxels (three-dimensional equivalent of a pixel) can be addressed by placing a spatial light modulator in the path of one or both of the beams. The three dimensional volume is excited in this manner by adjusting the relative time delay between the two pulses so that successive pulses overlap at different points in the material. The same principle can be applied to read and write information into a three-dimensional volume of material.

These and other objects and features of the present invention will be apparent from the following detailed description of the preferred embodiments and the accompanying drawings.

All of the above-mentioned articles, patents and patent applications are hereby incorporated herein by reference.

DETAILED DESCRIPTION OF THE PREFERRED EMBODIMENTS

The present invention described herein overcomes many of the problems associated with producing real-time, three-dimensional images with ultrashort pulses and two-photon imaging. To understand the principle of the present invention, first consider a femtosecond laser beam collimated to a diameter of 100 $\mu$m to 10 mm. Next, consider the fact that, for a pulse duration of 100 femtoseconds ($100*10^{-15}$ seconds), and given the speed of light c of $3*10^8$ meters/second, the pulse is limited in physical extent to only $3*10^8*100*10^{-15}=30$ micrometers ($\mu$m). Thus, the pulse can be visualized as a "pancake" propagating in the air. The pulse is 100 $\mu$m to 10 mm across, and extremely thin—only 30 microns thick. The shorter the pulse duration, the thinner the "pancake" becomes. Real-time, three-dimensional microscopy is made possible, in accordance with the present invention, by using this "pancake" profile of ultrashort pulses.

Figure 1:
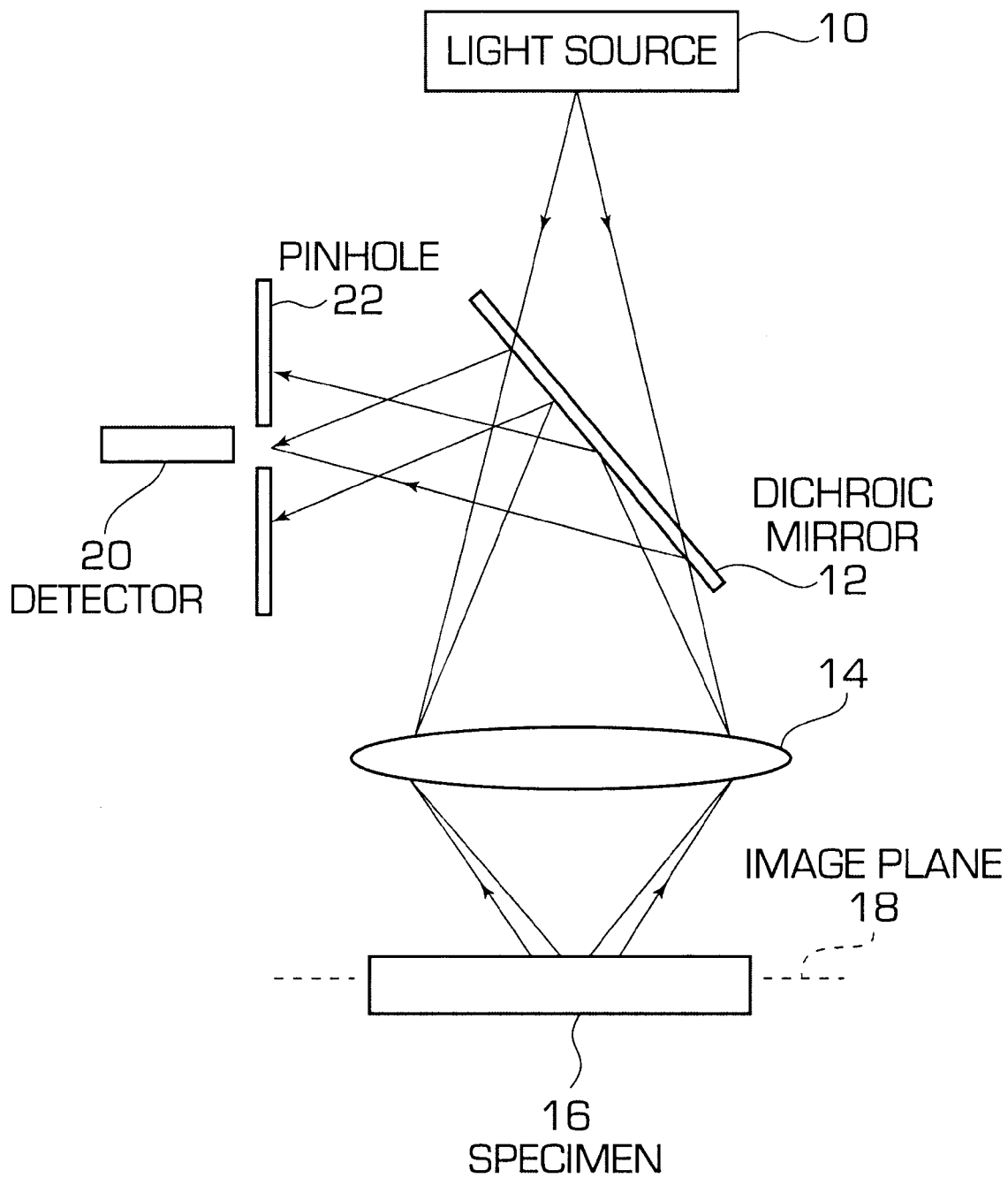
FIG. 1 is a diagrammatic view of a single-photon fluorescence confocal microscope.
Figure 2:
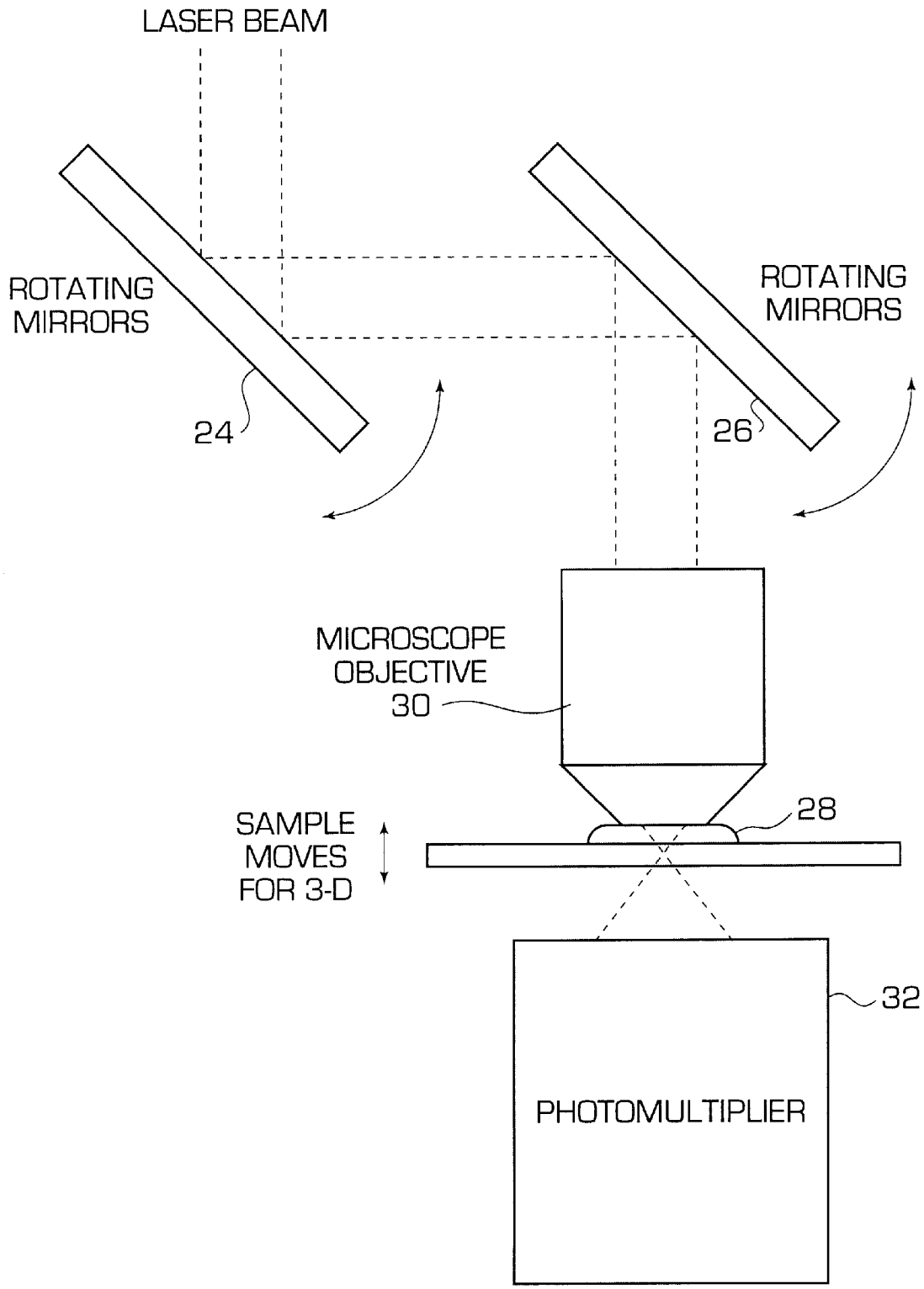
FIG. 2 is a diagrammatic view of a two-photon microscope capable of forming a three-dimensional image of a sample by scanning an incident laser beam using mirrors.
Figure 3:
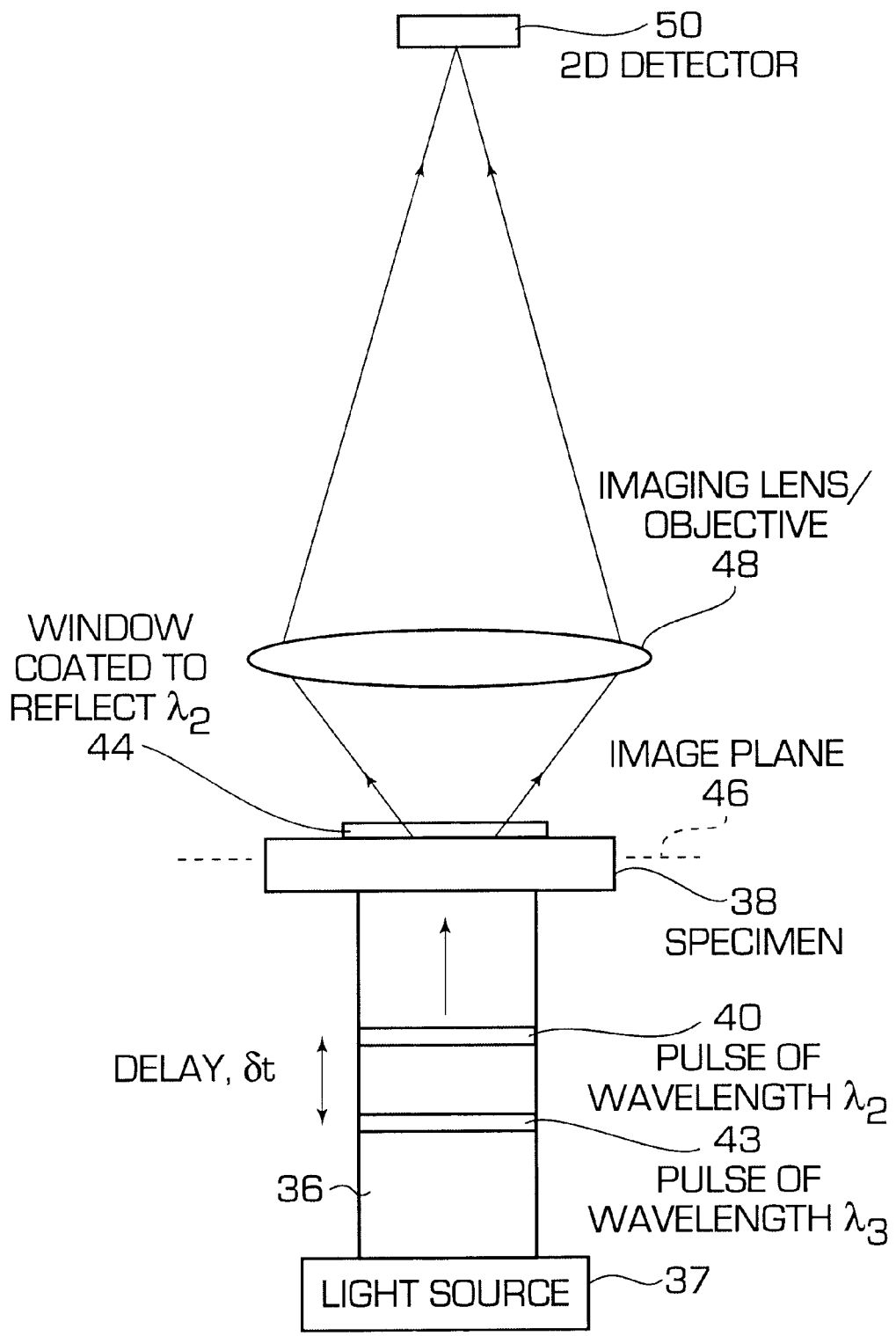
FIG. 3 is a diagrammatic view of a two-photon microscope system using plane wave illumination according to the first embodiment of the present invention.

FIG. 3 illustrates a two-photon microscope according to a first embodiment of the present invention. A collimated beam 36 produced by light source 37 is normally incident on the desired specimen 38. There are two pulses (40 and 42) contained in the collimated beam, of respective wavelengths $\lambda_2$ and $\lambda_3$, separated in time by a delay given by $\delta t$. This collimated beam 36 containing the pulses acts as the illumination source. The specimen is labeled with an appropriate fluorophore which is excited only by the simultaneous absorption of the two photons, $\lambda_2$ and $\lambda_3$. Thus, as long as the two pulses are not temporally coincident, i.e., $\delta t$ does not equal zero, the fluorophore remains unpumped, no emission is seen and no image is visible.

As shown in FIG. 3, a window 44 disposed on the opposite side of the specimen 38 from the incident beam 36 is coated such that it reflects light of wavelength $\lambda_2$ and transmits all other wavelengths. Because the pulse 40 at wavelength $\lambda_2$ enters the sample earlier, it reflects off of the window 44 and intersects the pulse 42 of wavelength $\lambda_3$ as it travels back through the specimen 38. At the time of intersection, the "pancake" volume now satisfies the excitation conditions for the fluorophore. Any portion of the specimen labeled with the fluorophore, lying within this pancake volume produces two-photon fluorescence, thereby creating an image plane 46 which can be visualized either in reflection or transmission. The depth discrimination in this system is achieved by the limited spatial extent of the pulses, i.e., the "thickness" of the "pancake". Importantly, an entire two-dimensional field has been created without the scanning of a single element, or descanning of the fluorescence. Thus, there is no concern that nonuniform scan velocities will affect the lateral image quality in this invention. Since neither a point nor a line has been rastered to create this two-dimensional field, the time in which this image is created is essentially instantaneous. The field can be transmitted through an imaging lens 48 and recorded through the microscope with a two-dimensional detector 50, such as a CCD array or equivalent.

The third dimension of the image is produced either by scanning the specimen 38 back and forth along the axial direction of the microscope, or by changing the time delay $\delta t$ between the pulses 40 and 42. Moving the specimen 38 at a few times the video rate makes it possible to visualize an entire three-dimensional, two-photon image in real-time either directly by eye or indirectly with a video system. The same holds true if the time-delay between the pulses is rapidly varied. This second method is particularly attractive, as the microscope would then have no moving parts. The specimen remains stationary, and no scanners are necessary for rastering the laser beam spatially, or descanning the fluorescence.

Another feature of the present invention, is that the three-dimensional image can be recorded as a two-dimensional field. That is, because it is not necessary to detect fluorescence confocally using a slit in front of the detector, the detected fluorescence is not limited to that in a narrow focal plane; rather, fluorescence throughout the excited "pancake" volume, including fluorescence from different points along the z-axis (i.e., the optical axis of the detector) within the excited volume is detected. Consequently, using an imaging lens with an appropriate numerical aperture, depth perception in the z direction is provided from detection of the fluorescence in a two-dimensional field (in the x and y directions normal to the z axis) by, for example, a CCD array. Thus, a three-dimensional image can be recorded as a two-dimensional field, thereby reducing the number of detections required to represent a three-dimensional volume. This automatic image compression dramatically reduces the amount of stored data, and thus, increases the span over which a biological specimen can be viewed given limited image storage space. The depth resolution in this case can be enhanced through some post-image capture processing, such as that disclosed by Chen et al. in "The Collection, Processing, and Display of Digital Three-Dimensional Images of Biological Specimens", *Handbook of Biological Confocal Microscopy*, Chapter 13, Second Edition, Plenum Press (1995), incorporated herein by reference. Depth resolution can also be enhanced by reducing the numerical aperture of the system.

Additionally, for non-identical wavelengths $\lambda_2$ and $\lambda_3$, background-free imaging is possible. An important question regarding the feasibility of this method of operation is whether the relative two-photon cross-section for two different wavelengths is the same as the cross-section for one wavelength (the degenerate case). This has been experimentally verified. A frequency-doubled fiber laser was focused into a mixture of the dye (APSS) [DEFINE], and the two-photon fluorescence was measured. The necessary degenerate or single color, two-photon excitation wavelength for this dye is 777 nm. The fiber system's frequency-doubled output was tuned to match 777 nm. In addition, through the use of an optical parametric generator, the same laser system was used to produce 1165 nm radiation and by frequency doubling this wavelength, 583 nm radiation. These wavelengths were determined such that $$1/583 + 1/1165 = 1/777 + 1/777$$

In this manner, the identical cross-section for the two color ($\lambda_2=583$ nm and $\lambda_3=1165$ nm) case and the degenerate case ($2\lambda_2=777$ nm) would be excited. The fluorescence rate, W is:

$$W \sim \sigma(I_1)^2$$

for the single color, two-photon process and $$W \sim \sigma(I_2 I_3)$$

for the two-color process, where I is intensity. The processes were considered equivalent within the limits of experimental error, since it was measured that, for $I_1^2 = I_2 I_3$, the fluorescence rate was identical, verifying that indeed the single color and two-color two-photon cross-sections are identical.

Figure 5:
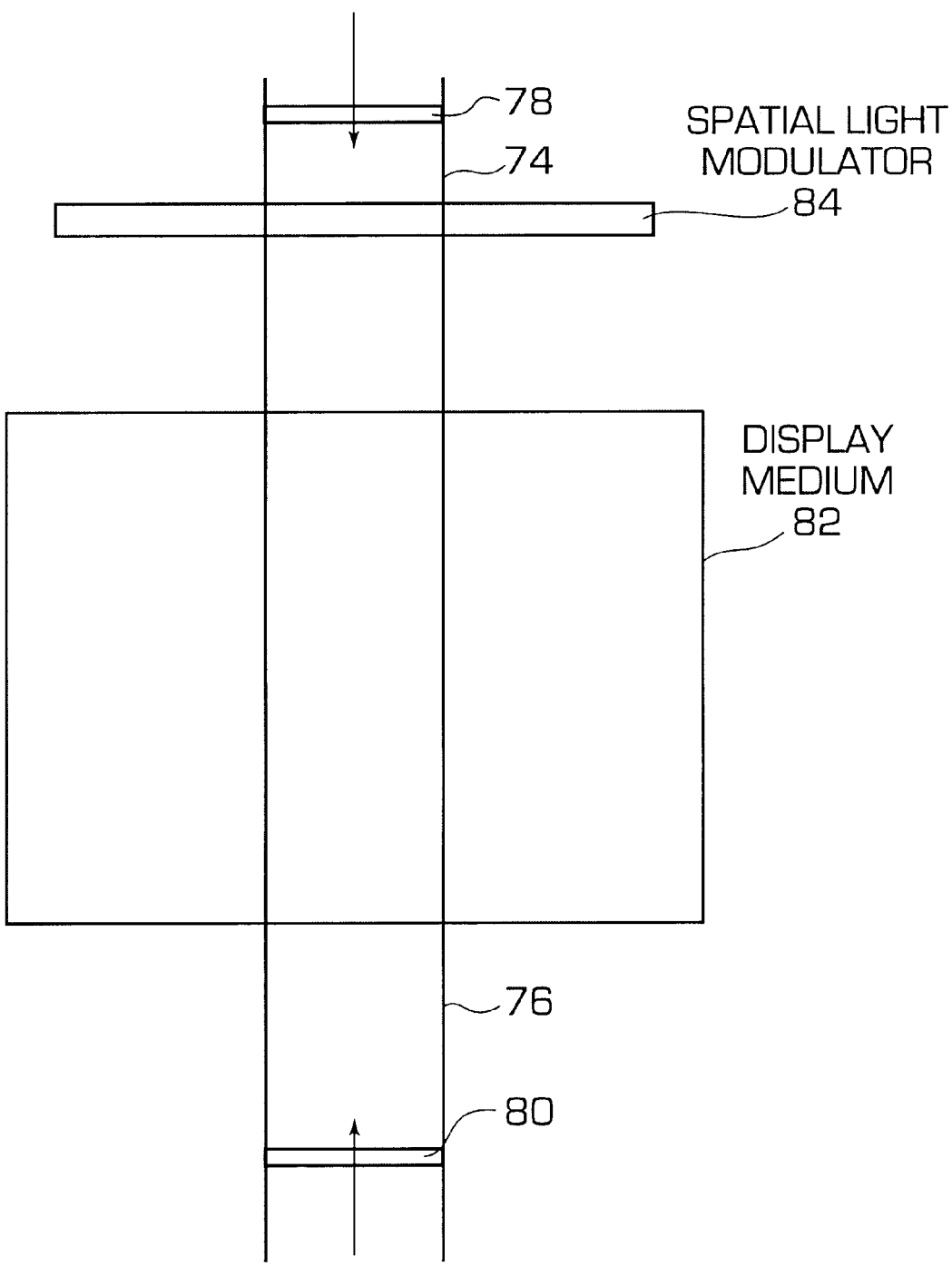
FIG. 5 is a diagrammatic view of a three-dimensional display device employing two-photon fluorescence according to the third embodiment of the present invention.

While the first embodiment has been shown in FIG. 3 with two pulses of wavelengths $\lambda_2$ and $\lambda_3$ being incident in a single beam from one direction, the pulses could be incident on the specimen from opposite directions, as shown in FIG. 5. This would eliminate the need for reflective window 44.

Figure 4A:
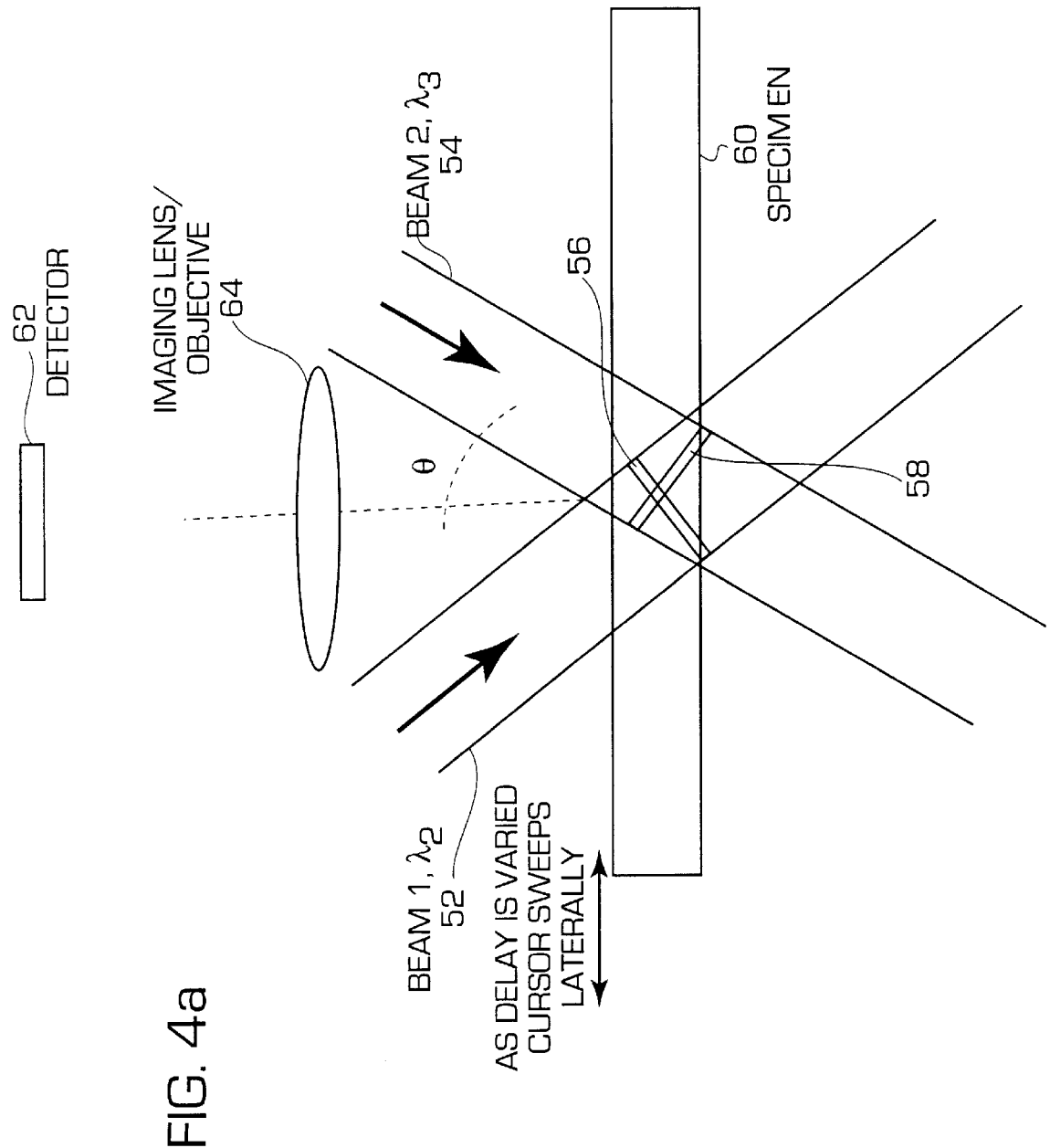
FIG. 4a is a diagrammatic view of a two-photon microscope system employing two intersecting beams according to the second embodiment of the present invention.

According to a second embodiment of the present invention illustrated in FIG. 4a, two collimated pulsed laser beams 52 and 54 of respective wavelengths $\lambda_2$ and $\lambda_3$ are recombined at some crossing angle $\theta$. As shown in FIG. 4a, at the intersection of the two beams, the two "pancakes" 56 and 58, which represent the pulses in each beam, interfere. The intersection of these two pulses, can then be seen to be a line. If an appropriately labeled specimen 60 is placed at this intersection, a two-photon signal is generated coincident with the spatial and temporal overlap of the pulses from each beam. The two-photon signal is generated only within the intersected volume of the two "pancakes" 56 and 58. Thus, a two-dimensional detector 62 looking down the bisector $\theta$ of the system through an imaging lens 64, sees a line. This line width is determined by the pulse width, and the angle of intersection $\theta$.

The crossing angle extremes can be readily visualized: For $\theta=0$, the entire two-dimensional field is filled, resulting in a plane wave, i.e., the geometry described in the first embodiment. Thus, the plane wave-producing system of the first embodiment is actually a special case of the second embodiment where the angle $\theta$ is 0 degrees. For a crossing angle of 90 degrees or less, a line, rather than a plane is generated. The width of the line increases as the angle decreases, approaching the plane wave at $\theta=0$.

It is important to note that, while the signals generated along the beams 52 and 54 are independent of one another, the intensity of the two-photon signal from the intersection volume depends on the presence of pulses 56 and 58 from both beams being present simultaneously, and whether two colors or a single color is used to generate the two-photon signal. First, consider the case where two colors are used (i.e., where wavelengths $\lambda_2$ and $\lambda_3$ are different). In this instance, if one beam is blocked, no two-photon signal is generated. Similarly, if one beam is delayed such that the two beams no longer arrive at the volume of intersection simultaneously, the two-photon signal is no longer generated. This is the background-free mode of operation.

For the single-color (where wavelengths $\lambda_2$ and $\lambda_3$ are the same), two-photon case, a background of two-photon fluorescence is generated regardless of whether the pulses 56 and 58 intersect within the specimen 60. If either beam 52 or 54 is blocked, the remaining beam will still generate a background of two-photon fluorescence. Similarly, if the delay is adjusted so that the pulses no longer meet within the intersection volume, a two-photon background is still generated by each beam. With proper timing, the intersection signal is generated, residing on this background. The peak-to-background signal to noise ratio is approximately four-to-one. Chopping one beam and using image subtraction techniques can significantly improve the signal-to-noise ratio, producing similar background free operation to the two-color, two-photon case.

As disclosed in the above-mentioned article by Brakenhoff et al., in a conventional two-photon confocal system, real-time images are created by scanning a line cursor across the specimen. This line cursor is a result of manipulating a single laser beam (and pulse) spatially. According to the second embodiment of the present invention, a line cursor is created through the use of two pulses, and hence, two laser beams intersecting. The line is a result of the short duration of the individual pulses in each beam. Thus, a "temporal" cursor has been created. In contrast to previous methods, no spatial conditioning of the beam is necessary to create the cursor. Another unique characteristic of the temporal cursor of the present invention compared to the more traditional spatial cursor is the manner in which the temporal cursor is scanned. The temporal cursor is scanned by delaying one of the laser pulses from one beam with respect to the other. In contrast, no type of temporal delay will result in the conventional spatial cursor being scanned—the beam must be physically deflected by some means other than a temporal delay.

The method by which an entire three-dimensional two-photon image can be created is also unique compared to previously established methods. For $\theta=0$, as described in the first embodiment, the specimen can be rastered back and forth in the axial direction of the microscope to generate a three-dimensional image, or the delay between the pulses can be varied. For $\theta>0$, the pulses of one beam are continuously delayed with respect to the other beam, to achieve the same effect. As the relative delay $\delta t$ is changed between the two pulses, the line sweeps laterally across the specimen, as shown in FIG. 4a. At each delay, an axial slice of the specimen is visualized. This slice is oriented 90 degrees with respect to the "pancake" of the $\theta=0$ case and parallel to the optical axis shown by the dotted line in FIG. 4a. For a continuous series of delays an entire three dimensional volume is swept out.

Figure 4B:
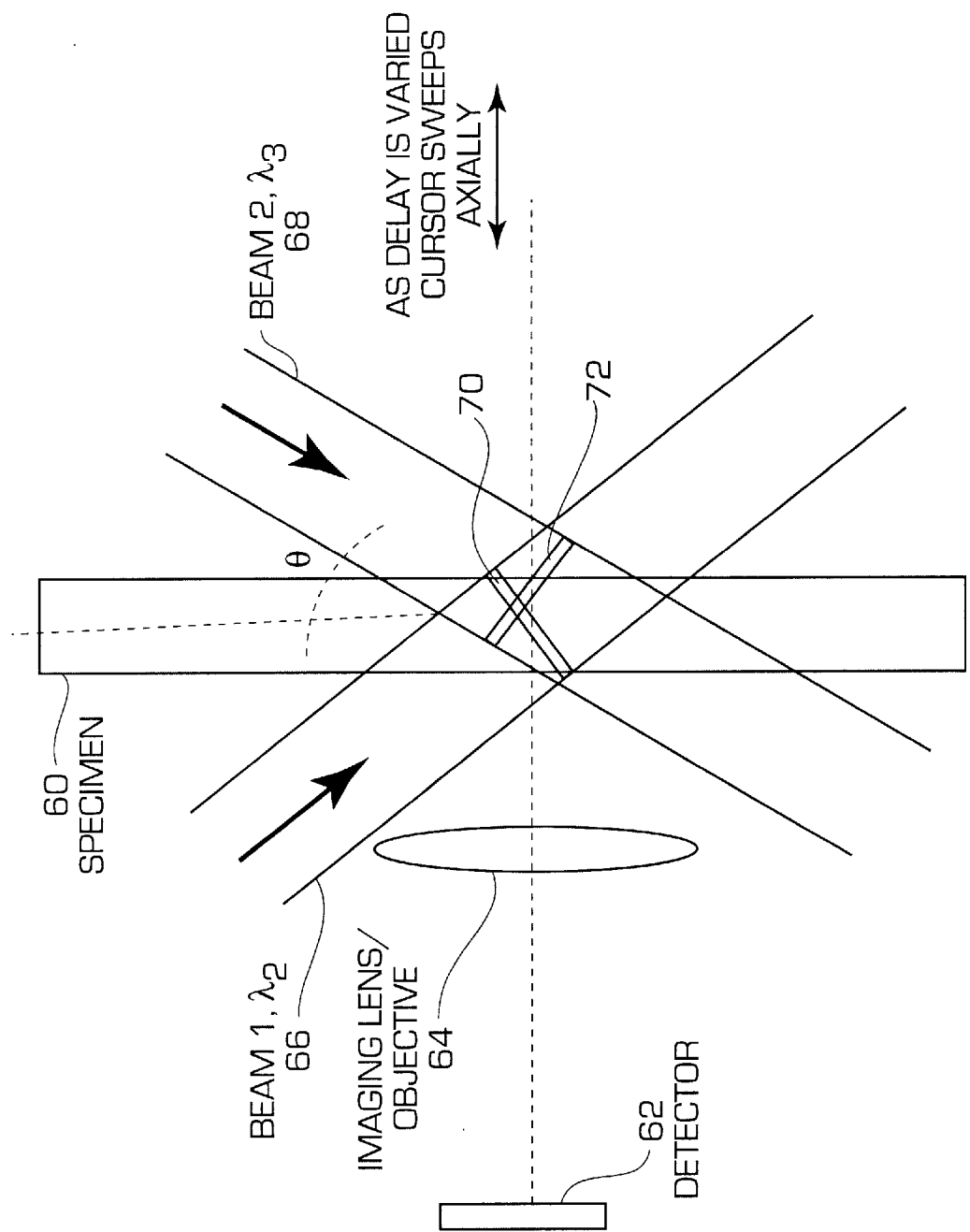
FIG. 4b is a diagrammatic view of an alternate arrangement of the two-photon microscope according to the second embodiment of the present invention.

FIG. 4b illustrates an alternative arrangement according to the second embodiment, wherein two collimated pulsed laser beams 66 and 68 of respective wavelengths $\lambda_2$ and $\lambda_3$ are recombined at a crossing angle $\theta$ relative to an axis which is orthogonal to the optical axis of the detector 62. In this case, the "slice" formed by each pair of intersecting pulses 70 and 72 is orthogonal to the optical axis of the detector 62 and parallel to the axis from which the beams are offset by the angle $\theta$. As the relative delay $\delta t$ is changed between the two pulses 70 and 72, the line cursor sweeps across the specimen along the optical axis of the detector.

For certain applications, it may also be desirable to operate in an optical sectional mode. This means recording the two-dimensional field for each delay separately. The three-dimensional image can then be constructed with the two-dimensional data sets as with traditional confocal microscopy. Again, however, the distinguishing feature of this invention is that, for each delay, the entire two-dimensional field at a given axial depth is created instantaneously without rastering the laser beam or descanning the fluorescence as is currently done in prior art systems. For example, in the arrangement shown in FIG. 4a the "slice" excited by a pair of intersecting pulses is oriented along the optical axis of the detector. When a confocal arrangement is not used (i.e., no slit or pin hole at the detector) fluorescence from this slice is collected in one set (line) of detections, and these detections provide depth perception in the resulting image.

In addition to the aforementioned imaging applications, this type of exploitation of the limited geometrical extent of femtosecond pulses can be used for other applications. For instance, as recently reported by Maruo et al. in "Three-dimensional microfabrication with two-photon-absorbed photopolymerization", *Optics Letters,* Vol. 22, pp. 132–134 (1997), it has been demonstrated that two-photon absorption can be used effectively to harden UV sensitive liquid polymer. This makes it possible to "write" within a cell containing liquid polymer, and selectively harden specific volumes, in order to fabricate microscopic structures. The method described herein could also be used in this context. Again, the advantage is that three-dimensional structures could be more rapidly fabricated, through the techniques described herein, rather than having to scan point-by-point as is done presently.

According to a third embodiment of the present invention, the aforementioned principle of selectively controlling two-photon emission is applied to a volume of doped material to form a three-dimensional display device. Two crossed beams (of different wavelengths) within a material which is appropriately doped for two-photon absorption, can cause specific voxels (three-dimensional equivalent of a pixel) within the material to emit fluorescence. These beams can then be rapidly rastered throughout the volume to create an image. The display device of the third embodiment of the present invention relies on the ability to create lines or planes of two-photon absorption and subsequent emission without rastering for creating the display. Individual voxels are still addressable by the use of a spatial light modulator (which could be a two dimensional liquid crystal array, for example) in one or both of the beams.

For example, as illustrated in FIG. 5, a first pulsed laser beam 74 of wavelength $\lambda_1$ is transmitted through a display medium 82 from one direction along an optical axis. A second pulsed laser beam 76 of wavelength $\lambda_2$ is transmitted through the display medium along the optical axis from the opposite direction. The relative timing of pulses 78 and 80 of beams 74 and 76 is controlled such that a specific horizontal plane (in the orientation shown in FIG. 5) of voxels are excited at one time. The amount of light of wavelength $\lambda_1$ reaching individual voxels within the plane is controlled by a two-dimensional spatial light modulator 84 disposed in the path of beam 74. Consequently, the spatial light modulator can be used to control of the amount of excitation and emission within each voxel, so that a planar image can be formed from the intersection of one set of pulses 78 and 80 within the display material 82. A three-dimensional image is formed by varying the relative delay of pulses 78 and 80 so that they intersect at different planes within the display material for each successive set of pulses. Note that the voxel size (length along the optical axis in FIG. 5) is determined by the pulse duration. Although the example illustrated in FIG. 5 employs the pancake-shaped overlapping volume of the first embodiment, it can readily be seen that a three-dimensional display can be implemented using the beam orientation of the second embodiment.

The arrangement shown in FIGS. 3–5 can also be applied to form an optical memory device, wherein three-dimensional volumes can be rapidly written to and read from. The typical method by which digital information is stored is to alter some type of storage medium in such a manner that the state of the storage medium can be distinguished as either a one or a zero. This alteration can be permanent, representing read-only-memory (ROM) or it can be erasable, i.e., information can be stored and either recovered at a later time, or new information can be written onto the medium erasing any information that had been stored there originally.

According to the present invention, a digital data bit is created using multiphoton absorption to alter the medium. This alteration can be made permanent, for example, by creating a damage spot at a particular location within the medium. Alternatively, the alteration can be temporary, by merely changing the local absorption or emission characteristics of the medium. Thus, both types of memory, ROM, and read/write memory can be achieved with the present invention.

The basic architecture for accomplishing the memory storage is similar to that which has been described for performing microscopy and three-dimensional display. The writing is accomplished with two pulsed beams, which can either be identical in wavelength or differ in wavelength. When the two beams overlap in both space and time, then multiphoton absorption occurs. The intensity of the two spatio-temporal overlapped beams can be such that the absorption/emission characteristics at the region of overlap within the recording medium are temporally changed, or the medium is permanently altered—by multiphoton induced dielectric breakdown for instance.

Specifically, two beams intersect within the recording medium according to one of the above-described techniques. The medium is chosen specifically to be sensitive to multiphoton absorption of the wavelengths used in the writing beams. For example, if the medium strongly absorbs at 400 nm, either the two writing beams could be used at 800 nm or a combination of wavelengths such that $1/\lambda_1+1/\lambda_2=1/400$ where $\lambda_1$ and $\lambda_2$ are the wavelengths of the writing beams. The two beams intersect within the volume, with their volume of intersection forming a line or a plane, depending on whether the beams are non-collinear or collinear. By varying the relative timing between the pulses, the line or plane changes position within the volume. Multiphoton absorption occurs at the line or plane, thereby recording of information. Due to the fact that the relative timing between the pulses can be altered such as to move this line or planar region spatially throughout the recording medium, storage actually occurs in three dimensions. In contrast, on standard magnetic recording media, such as floppy disks, the storage is only two dimensional, occurring at the surface of the disk or tape. In the present invention, storage occurs throughout the volume of the medium, enabling the efficient use of all three dimensions. Thus, increased density storage is possible as this invention uses depth as well as the lateral dimensions.

Since storing a bit of information as either a line or plane would be wasteful and unnecessary, a spatial light modulator can be used in path of one or both of the writing beams. The spatial light modulator controls the amount of light reaching individual voxels within the line or plane of intersection. In this manner, voxels within the line or plane are individually addressable, greatly enhancing the utility of this technique. One particularly strong advantage of this method compared to other techniques is that many of voxels can be addressed simultaneously. To illustrate is basic concept, imagine placing a "checker board" mask in the path of one of the writing beams. In practice, such a mask could be created by a two dimensional, programmable liquid crystal array. In the dark areas of the checker board mask, light is blocked, and the clear areas allow the light to be transmitted. Thus, in the beam passing through the mask, the incident light beam which appears as a "pancake" is broken up into an array of miniature "checker board" squares. In the second light beam, the light is unperturbed, and still arrives at the storage medium as a "pancake." When the two beams intersect, a solid line or plane will no longer be written into the medium. Because one of the arms has had various areas blocked out, the multiphoton writing process will occur only in those regions where light is present from both beams. Thus, in the case of two collinear beams, a checkerboard pattern of voxels is written into the medium. In the case of noncollinear beams, a checkerboard pattern of voxels is also written into the medium. In this case however, the normal of the plane containing the voxels is perpendicular to the bisector of the k-vectors which represent the direction of propagation of the incident light beams. For the case of collinear beams, the normal of the plane containing the voxels is collinear to the k-vectors which represent the direction of propagation of the incident light beams. Note that the voxel is limited in space by the finite duration of the short pulses used in is technique. In contrast, all known methods require some form of spatial discrimination to limit the writing to a small volume. Unlike the known methods, this technique relies on the pulsewidth to limit the volume that is written to.

Although several exemplary embodiments have been herein shown and described, those of skill in the art will recognize that many modifications and variations are possible without departing from the spirit and scope of the invention, and it is intended to measure the invention only by the appended claims.

What is claimed is:

1. A device for causing two-photon excitation of a fluorophore present in a material, comprising:
    a light source producing (a) a first pulse of a first wavelength and (b) a second pulse of a second wavelength, the second pulse intersecting the first pulse within said material such that a spatial and temporal overlap of the first and second pulses causes excitation of said fluorophore within an intersection volume of the material by means of two-photon absorption, the intersection volume being defined by said overlap and continuously extending along a plane; and
    a detector disposed to detect light emitted from the excited fluorophore within the intersection volume, said detector detecting a two-dimensional field of emission from the temporal and spatial overlap of the first pulse and the second pulse.

2. The device according to claim 1, wherein the first pulse and the second pulse are incident on the material from a same direction, the second pulse being delayed relative to the first pulse, the device further comprising a reflector disposed on an opposite side of the material from the incident first and second pulses, said reflector reflecting the first pulse such that the reflected first pulse and the incident second pulse temporally and spatially overlap within the material in a pancake-shaped volume.

3. The device according to claim 1, wherein said light source comprises a first laser producing said first pulse, said first pulse being incident on the material from one side of the material along an optical axis, and a second laser producing said second pulse, said second pulse being incident on the material from the opposite side of the material along said optical axis, such that the first pulse and the second pulse temporally and spatially overlap within the material in a pancake-shaped volume.

4. The device according to claim 1, wherein said light source produces a series of pairs of said first and second pulses, and wherein a three-dimensional volume of the material is scanned by adjusting a relative timing of the first pulse and the second pulse for successive pairs in the series.

5. The device according to claim 1, wherein said light source produces a series of pairs of the first and second pulses, and wherein a three-dimensional volume of the material is scanned by moving the material along an optical axis of said detector.

6. The device according to claim 1, wherein said first and second pulses are ultrashort pulses.

7. The device according to claim 1, wherein said detector comprises a two-dimensional detector including a charge coupled device (CCD) array.

8. The device according to claim 1, wherein the first wavelength is different from the second wavelength.

9. The device according to claim 1, wherein said material is a specimen.

10. The device according to claim 1, wherein said material forms a three-dimensional display device.

11. The device according to claim 1, wherein said material comprises a memory device which stores digital bits of information.

12. A two-photon fluorescence microscope, comprising:
    a light source producing (a) a first pulse of a first wavelength which is incident on a specimen containing a fluorophore at a first time and (b) a second pulse of a second wavelength which is incident on the specimen at a second time, said first pulse and said second pulse temporally and spatially overlapping within the specimen in a pancake-shaped volume to substantially instantaneously excite throughout a two-dimensional field of said fluorophore by two-photon absorption; and
    a two-dimensional detector disposed to detect a two-dimensional field of light emitted from the excited fluorophore within the pancake-shaped volume.

13. The microscope according to claim 12, wherein the first pulse and the second pulse are incident on the specimen from a same direction, with said second time being different from said first time, the microscope further comprising a reflector disposed on an opposite side of the specimen from the incident first and second pulses, said reflector reflecting the first pulse such that the reflected first pulse and the incident second pulse temporally and spatially overlap within the specimen in the pancake-shaped volume.

14. The microscope according to claim 12, wherein said light source comprises a first laser producing said first pulse, said first pulse being incident on the specimen from one side of the specimen along an optical axis, and a second laser producing said second pulse, said second pulse being incident on the specimen from the opposite side of the specimen along said optical axis, such that the first pulse and the second pulse temporally and spatially overlap within the specimen in the pancake-shaped volume.

15. The microscope according to claim 12, wherein said light source produces a series of pairs of said first and second pulses, and wherein a three-dimensional volume of said specimen is scanned by adjusting a relative timing of said first pulse and said second pulse for successive pairs in the series.

16. The microscope according to claim 12, wherein said light source produces a series of pairs of said first and second pulses, and wherein a three-dimensional volume of said specimen is scanned by moving the specimen along an optical axis of said light source.

17. The microscope according to claim 12, wherein said first and second pulses are ultrashort pulses.

18. The microscope according to claim 12, wherein said two-dimensional detector is a charge coupled device (CCD) array.

19. The microscope according to claim 12, wherein the first wavelength is different from the second wavelength.

20. A two-photon fluorescence microscope, comprising:
    a first light source producing first pulses of a first wavelength which are incident on a specimen containing a fluorophore;
    a second light source producing second pulses of a second wavelength which are incident on the specimen, an angle of incidence of the second pulses being at a crossing angle with respect to an angle of incidence of the first pulses, such that, at a given instant, one of said first pulses and one of said second pulses intersect at a line-shaped volume within the specimen, causing excitation of said fluorophore within said line-shaped volume by means of two-photon absorption within the volume; and a detector disposed to detect light emitted from the excited fluorophore within the volume, a two dimensional field of emission being detected from one of said first pulses intersecting one of said second pulses.

21. The microscope according to claim 20, wherein, as the intersecting first and second pulses travel through the specimen, the line-shaped volume progresses along a plane within the specimen.

22. The microscope according to claim 21, wherein a three-dimensional volume of said specimen is scanned by adjusting a relative timing of said first pulse and said second pulse for successive pairs of intersecting pulses, such that the plane along which the line-shaped volume travels is displaced in a lateral direction.

23. The microscope according to claim 20, wherein a width of the line-shaped volume is determined by a pulse width of the first and second pulses and by the crossing angle.

24. The microscope according to claim 20, wherein the first wavelength is different from the second wavelength.

25. A method of selectively exciting a fluorophore present in a material, comprising the steps of:

directing a first light pulse of a first wavelength into said material;

directing a second light pulse of a second wavelength into said material;

spatially and temporally overlapping the first light pulse with the second light pulse within the material such that the first and second pulses cause excitation of said fluorophore within an intersection volume of the material by means of two-photon absorption, the intersection volume being defined by said overlapping and continuously extending along a plane; and detecting light emitted from the excited fluorophore within the intersection volume, a two-dimensional field of emission being detected from the temporal and spatial overlap of the first pulse and the second pulse.

26. The method according to claim 25, wherein the first pulse and the second pulse are incident on the material from a same direction, the second pulse being delayed relative to the first pulse, the method further comprising the step of:

reflecting the first pulse such that the reflected first pulse and the incident second pulse temporally and spatially overlap within the material in a pancake-shaped volume.

27. The method according to claim 25, wherein said first pulse is incident on the material from one side of the material along an optical axis, and said second pulse is incident on the material from the opposite side of the material along said optical axis, such that the first pulse and the second pulse temporally and spatially overlap within the material in a pancake-shaped volume.

28. The method according to claim 25, further comprising the steps of:

producing a series of pairs of said first and second pulses; and scanning a three-dimensional volume of the material by adjusting a relative timing of the first pulse and the second pulse for successive pairs in the series.

29. The method according to claim 25, further comprising the steps of:

producing a series of pairs of the first and second pulses; and scanning a three-dimensional volume of the material by moving the material along an optical axis of a detector detecting light emitted from the excited fluorophore.

30. The method according to claim 25, wherein the first wavelength is different from the second wavelength.

* * * * *